United States Patent

[11] 3,605,109

[72] Inventors Tommy N. Tyler
Englewood;
Peter R. Lowe, Denver, both of, Colo.
[21] Appl. No. 1,427
[22] Filed Jan. 8, 1970
[45] Patented Sept. 14, 1971
[73] Assignee Honeywell Inc.
Minneapolis, Minn.

[54] METHOD AND APPARATUS FOR PRODUCING CONTINUOUS GRAPHIC DISPLAYS FROM INTERMITTENTLY SAMPLED DATA
20 Claims, 10 Drawing Figs.

[52] U.S. Cl. .................................................. 346/1,
346/110, 346/34
[51] Int. Cl. .................................................. G01d 9/32
[50] Field of Search .......................................... 346/1, 110,
108, 74 SB, 74 SC, 74 CH, 74 CR, 74 E, 34

[56] References Cited
UNITED STATES PATENTS
2,907,622 10/1959 Hurvitz........................ 346/74 SC
3,339,543 9/1967 Richard....................... 346/110 R X

*Primary Examiner*—Joseph W. Hartary
*Attorneys*—Arthur H. Swanson, Lockwood D. Burton and George E. Bodenstein ABSTRACT: The values of a plurality of data signals to be plotted against time as curves on a moving photosensitive record sheet are sampled by being simultaneously compared continuously with a single cyclically repeated ramp voltage by a plurality of comparators. Each of the latter produces an output each time that the ramp voltage just exceeds the value of the corresponding signal. The ramp voltage is synchronized with the horizontal sweep for a fiber optics cathode-ray tube, across the optics strip of which the record sheet is advanced at right angles. An EXCLUSIVE OR gate for each signal unblanks the normally blanked beam of the tube for a period in each sweep to mark a line on the sheet. Each period is that in which the ramp voltage lies between the two values of the corresponding signal at which the corresponding comparator output is produced for the present and the immediately previous sweeps. The lines produced for each signal combine to form a recorded curve for that signal. In one form, each gate is controlled by the corresponding comparator output applied both directly and through a device providing a delay of one sweep period. In another form, each gate is controlled by two comparator outputs, one based on the present value of the corresponding signal, and the other based on a stored value of that signal from the previous sweep.

INVENTORS.
TOMMY N. TYLER
PETER R. LOWE
BY
George E. Bulenstein
AGENT.

PATENTED SEP 14 1971  3,605,109

INVENTORS.
TOMMY N. TYLER
PETER R. LOWE
BY
*George E. Bodenstein*
AGENT.

INVENTORS.
TOMMY N. TYLER
PETER R. LOWE
BY George E. Bodenstein
AGENT.

METHOD AND APPARATUS FOR PRODUCING CONTINUOUS GRAPHIC DISPLAYS FROM INTERMITTENTLY SAMPLED DATA

BACKGROUND OF THE INVENTION

The present invention relates generally to the production of graphic displays of analog data, such as the conditions of electrical data signals as these conditions vary with some factor, such as time. Specifically, the invention relates to methods and arrangements for producing such displays, in the form of indicated and/or recorded curves, on the basis of intermittently obtained values or samples which represent successive conditions of the signals.

More specifically, the present invention relates to methods and arrangements as aforesaid which produce or plot a plurality of curves simultaneously, for a corresponding plurality of data signals, on a single display medium, using but a single display marking means and sampling and time-sharing techniques.

Graphic display producing arrangements of the foregoing type, for producing single or multichannel analog or curve indications and/or records of sampled data, are known in the art. However, all of such known arrangements of which we are aware have had the undesirable characteristic of producing or plotting each of their curves as a series of separated elements, such as dots or spots, instead of as a substantially continuous line or trace. As a result, these curves produced by the known arrangements, and the resulting overall indications and/or records, are often difficult, if not impossible, to interpret and analyze. This is particularly true in the case of a plurality of superimposed or overlapping curves representing data signals having a relatively high frequencies and/or irregular waveforms.

SUMMARY OF THE INVENTION

Accordingly, it is an object of the present invention to provide an improved method of producing a graphic display from intermittently sampled data, which method yields substantially continuous, and hence clearly readable, indicated and/or recorded curves, notwithstanding the intermittent nature of the sampled data used as the information from which the curves are produced or plotted.

A further object of the invention is to provide improved apparatus which operates according to said method to produce a substantially continuous curve from intermittently sampled values, or to produce a plurality of substantially continuous curves simultaneously for a plurality of intermittently sampled data signals.

A still further object of the present invention is to provide an improved method and apparatus as aforesaid which yield curves as described above notwithstanding wide, irregular, and/or rapid variations in the conditions or values of the signals which the curves represent. Another object of the invention is to provide such apparatus which is of relatively simple, and hence reliable and economically feasible, construction.

In accomplishing the foregoing and other desirable objects, the novel method according to the present invention includes the step of analyzing each data signal, for which a graphic display is to be produced, to derive a succession of values each of which represents a successive condition of the signal. This may be done by intermittently or repeatedly sampling the value of the signal, as by comparing the latter to a sweep or ramp comparison signal, whereby the resulting successively derived values represent successive sampled values of the signal.

The foregoing step is accompanied by the step of producing or marking successive lines on a display medium, such as an indicating screen or a record medium, each of said lines extending between two points, the positions of which points on the medium represent, respectively, a corresponding two consecutively derived ones of said values. When said derived values represent the sampled values of the signal, the position of one of said points for a given one of said lines represents the value of the signal as presently sampled, and the position of the other point for that line represents the value of the signal obtained from the immediately previous sampling. These successively produced lines combine to form what appears to the eye to be a continuous indicated and/or recorded trace or curve representing the condition of the data signal as this condition varies with time or some other factor. When a plurality of data signals is involved, this method includes the repeated analyses of each of the signals, and the production of said lines, and hence a curve, for each of the signals.

Also, in accomplishing the above-described and other desirable objects pertaining to apparatus, the novel apparatus according to the present invention includes means connected to the source of the data signal to be displayed. This means derives a succession of values, each of which represents a successive condition of said signal, and may be a sampling means providing successive values representing successive sampled values of said signal.

Said apparatus also includes means for producing successive lines on a display medium so that each line extends between two points the positions of which represent, respectively, a corresponding two, consecutively derived ones, of said derived values. When the latter represent successive sampled values of said signal, the positions of said points for each of said lines represent, respectively, the presently sampled and the immediately previously sampled values of said signal.

In one form of such apparatus, the foregoing operation is accomplished by the use of means for generating a sweep signal for sweeping a display marking means, such as a cathode ray tube beam, across a display medium, means for comparing a synchronized ramp signal to the data signal, and means for causing the marking means to mark the medium during each sweep only when the ramp signal lies between two values, one of which is that at which the ramp signal just exceeds the data signal in that sweep, and the other of which is that at which the ramp signal just exceeded the data signal in the immediately previous sweep. When a display of a plurality of data signals is to be produced, the apparatus includes means for dealing with each data signal repeatedly in the manner just described.

BRIEF DESCRIPTION OF THE DRAWING

A better understanding of the present invention may be had from the following detailed description when read in connection with the accompanying drawings, wherein.

DESCRIPTION OF THE PREFERRED EMBODIMENTS

Figure 1:
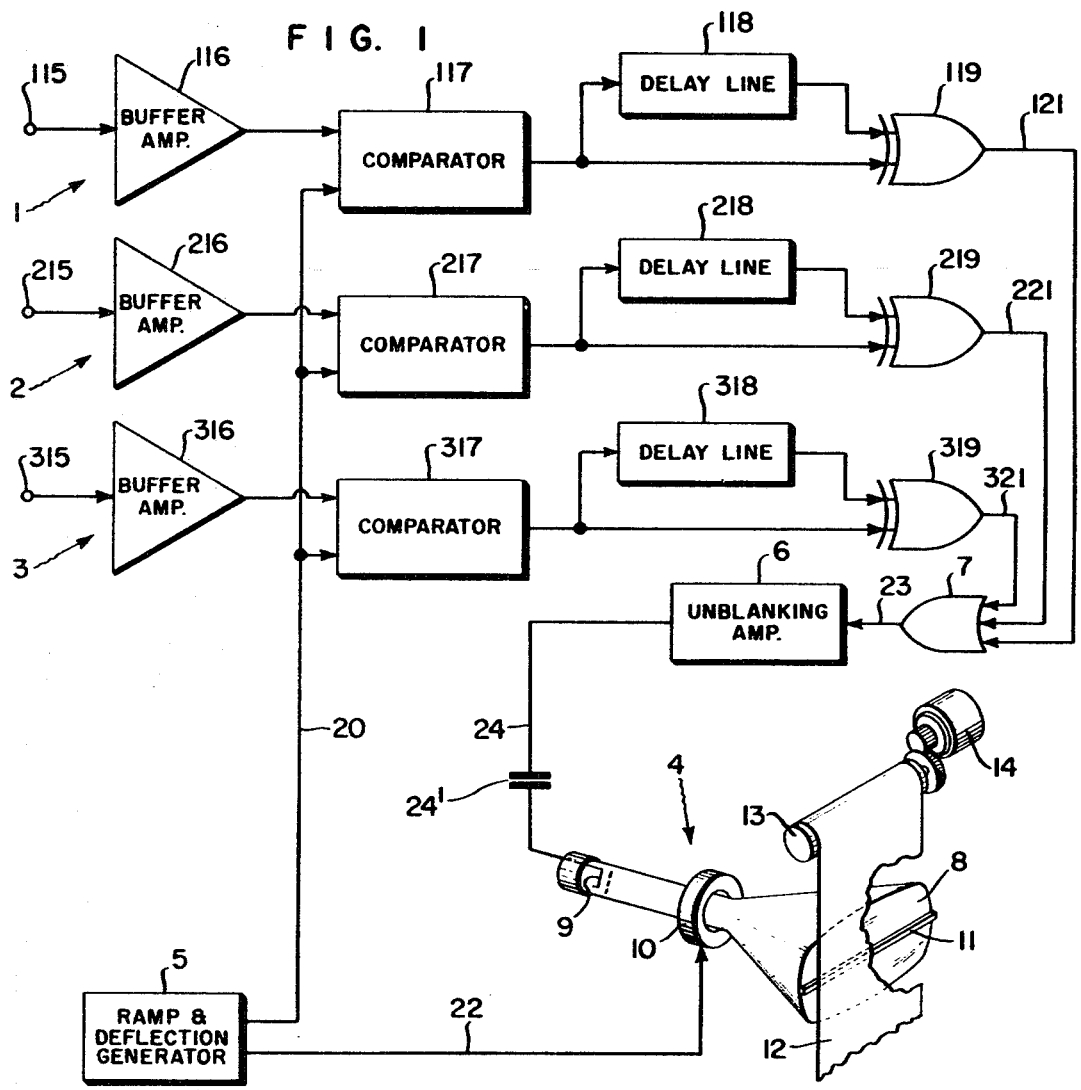
FIG. 1 is a diagram of multichannel display-producing apparatus according to the present invention, employing the novel method thereof.

The Apparatus of FIG. 1

The multichannel display apparatus of FIG. 1 is one which is arranged to produce an analog display of the values of three data signals simultaneously. This display is in the form of a record which bears three curves of signal value vs. time, each curve representing a respective one of the data signals. These curves are drawn or plotted by a cathode ray tube beam operating as a marking means on a display medium to provide line scan recording. The medium is in the form of a moving photosensitive record sheet. In accordance with the present invention, each curve is recorded as a series of lines, which together give the appearance of a continuous curve, notwithstanding the fact that progressive sampling of the signal values is employed.

Consonant with the foregoing, the FIG. 1 apparatus includes data signal channels or circuit portions 1, 2, and 3, a fiber optics cathode ray tube 4, a ramp and deflection signal generator 5 having a ramp signal output and a deflection signal output, an unblanking amplifier 6, and a master OR gate 7 having three inputs. The tube 4 is of the known fiber optics type having a faceplate 8 and a gun including a cathode 9 with which the cathode ray beam of the tube 4 is controlled. A horizontal deflection coil 10 is associated with the tube 4 in the usual manner.

The tube 4 also includes a fiber optics array or strip 11 inserted into the faceplate 8. A photosensitive record sheet 12 is advanced at a predetermined rate, downwardly in FIG. 1 over the strip 11 from a supply roll 13 by means of a suitable motor 14.

The data channel 1 includes an input connection 115, a buffer amplifier 116, a comparator 117, a delay line 118, and an EXCLUSIVE OR gate 119. The connection 115, which is intended for connection to the source of the first of the three signals to be recorded, is connected to the input of the amplifier 116. The output of the latter is connected to one of the two inputs of the comparator 117, the remaining input of which is connected to the ramp signal output of the generator 5 by way of a ramp signal connection 20. The output of the comparator 117 is connected directly to one of the two inputs of the EXCLUSIVE OR gate 119, and is connected through the delay line 118 to the other input of the gate 119. The output of the latter is connected by a connection 121 to one of the three inputs of the master OR gate 7.

The data channel 2 is identical to the channel 1 as just described, and includes input connection 215, buffer amplifier 216, comparator 217, delay line 218, and EXCLUSIVE OR gate 219. Also, the data channel, 3 is identical to the channels 1 and 2, including input connection 315, buffer amplifier 316, comparator 317, delay line 318, and EXCLUSIVE OR gate 319.

The interconnections between the elements of each of the channels 2 and 3 are the same as those for the channel 1. Thus, the ramp signal output of the generator 5 is applied to the inputs of the comparators 217 and 317 by the connection 20 as it is in the case of the comparator 117, and the outputs of the gates 219 and 319 are connected by respective connections 221 and 321 to corresponding separate inputs of the gate 7. The connections 215 and 315 are intended for connection to the respective sources of the second and third of the three data signals to be recorded.

To complete the description of the connections within the FIG. 1 apparatus, it is noted that the deflection signal output of the generator 5 is connected by a deflection signal connection 22 to the deflection coil 10 of the tube 4. The output of the gate 7 is connected by a connection 23 to the input of the unblanking amplifier 6, while the output of the latter is connected by a connection 24 and a DC blocking capacitor 24' to the cathode 9 of the tube 4.

Operation of the FIG. 1 Apparatus

Before describing the operation of the complete recording apparatus of FIG. 1, the nature and operation of certain of the components thereof will be explained. Considering first the generator 5, it is noted that this device produces two synchronized signals. The first of these signals is a cathode ray tube deflection or sweep signal of the usual ramp or sawtooth type. This signal is applied to the deflection coil 10 over the connection 22, and causes the beam of the tube 4 alternately to sweep and fly back across the tube face repeatedly, as will be described in more detail hereinafter.

The second of said two generator signals is a ramp voltage signal, the value of which is repeatedly swept between predetermined minimum and maximum values in synchronism with said sweeping of the beam across the face of the tube 4. This ramp signal is applied to the comparators 117, 217, and 317 over the connection 20 as a comparison signal, as will be explained more fully hereinafter.

The tube 4 is arranged, in the usual manner, so that, when the tube beam is swept across the tube face under the action of the aforementioned deflection signal, the beam sweeps along the inboard edge of the strip 11, and, in cooperation with the tube phosphor, successively illuminates the inboard ends of the fiber optics elements which make up the strip 11. However, the amplifier 6 normally maintains the tube 4 blanked, and the beam deactivated or off, whereby there is normally no illumination of the strip 11.

Whenever a signal is present on the connection 23 to the amplifier 6, however, the latter unblanks the tube 4 and turns on the beam of the tube via the connection 24 and the cathode 9. As long as the beam is so activated, it effectively produces or marks a line on and across the sheet 12. This lines will be drawn along that transverse element of the sheet 12 which is then in register with the strip 11, and will extend from the point along the sweep path at which the tube 4 becomes unblanked to the point along the sweep path at which the signal to the amplifier 6 on the connection 23 disappears and the tube 4 becomes blanked once more. Due to the downward motion of the sheet 12 over the strip 11, each of said lines will, obviously, be somewhat slanted on the sheet, and successive lines will be displaced along the length of the sheet by distances determined jointly by the sweep frequency and the speed of the movement of the sheet.

Figure 2:
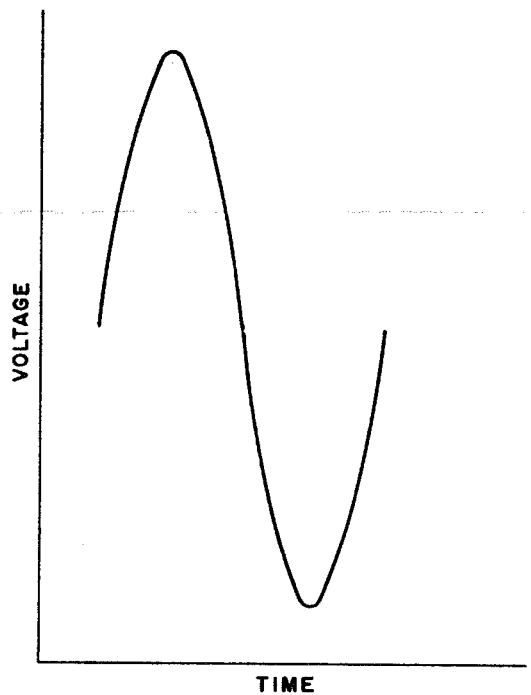
FIG. 2 is a curve of voltage vs. time for a data signal which is representative of the type with which the FIG. 1 apparatus is used.

For the purposes of the following description of the operation of the FIG. 1 apparatus, let it be assumed that a signal having the waveform shown in FIG. 2 is applied to the channel 1 via the connection 115. Let it be assumed also that other data signals are applied to the connections 215 and 315. In the interest of clarity, however, the initial portions of this description will treat said operation as though only the channel 1 was being utilized.

The data signal applied to the connection 115, as suitably amplified by the amplifier 116, is applied as a voltage signal to the upper input of the comparator 117. The latter continuously compares the value of this signal to the value of the ramp or comparison voltage signal which, as previously noted, is applied to the lower input of the comparator 117 over the connection 20. This operation can best be understood by reference to FIG. 3, which shows the relationship between the applied data signal, the sweeping or scanning operation of the ramp signal and the cathode ray beam, and the recorded lines produced by the latter for a typical situation.

Figure 3:
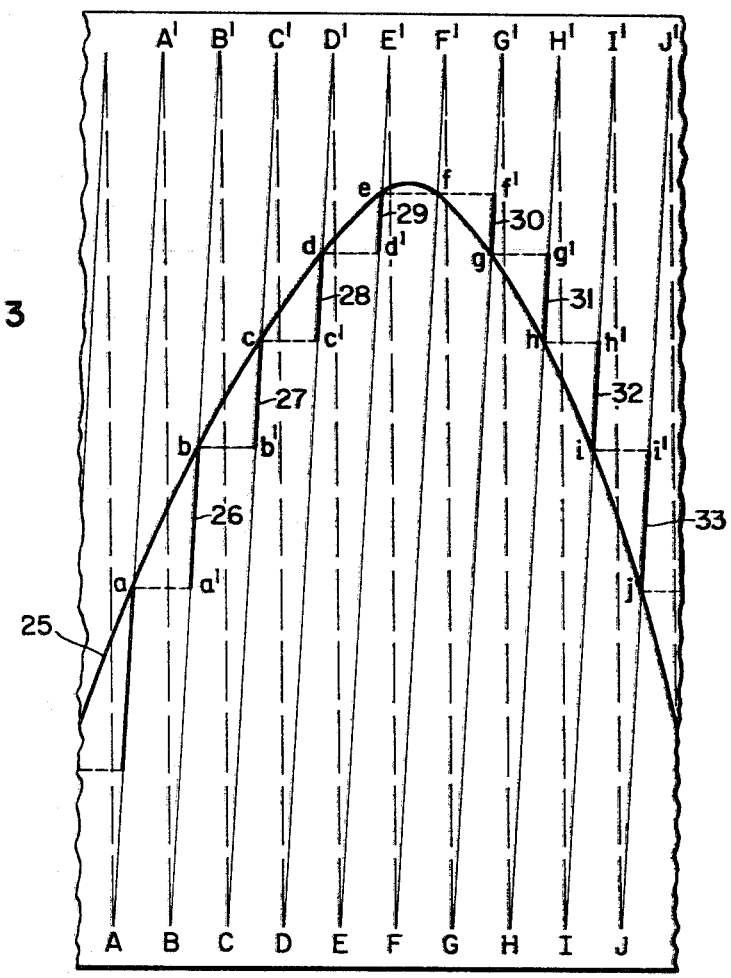
FIG. 3 is a diagram which illustrates the nature of the curves produced by the apparatus of FIG. 1.

In FIG. 3, the series of light solid lines A—A', B—B', etc., represent successive scan or sweep paths for the cathode ray beam across the sheet 12, assuming time to be increasing toward the right. The dashed lines between the sweep paths represent the return or flyback paths of the beam. For the purpose of providing a clear illustration of the action which takes place, the foregoing lines have been shown with exaggerated spacing along the time axis, as would occur if the sheet 12 were being moved past the tube 4 at an abnormally high rate.

The lines A—A', B—B', etc., also represent successive sweeps of the value of the ramp signal applied to the comparator 117 as this value sweeps in synchronism with the sweeping of the cathode ray beam. The heavy line 25 in FIG. 3 represents the actual value of the data signal, with respect to time, as applied to the comparator 117.

Considering now what occurs during a given sweep or scan, such as the sweep A—A', it is seen that, as the value of the ramp signal rises along the line A—A' from its lowest value, it eventually reaches a point of coincidence with the value of the data signal. This point is the point *a* in FIG. 3, and the value of the ramp and data signals at this point or time in the sweep will, for convenience, be referred to herein as the present value of the data signal for the sweep A—A'. Similarly, the point *b* represents the present value of the data signal for the immediately succeeding sweep B—B', the point *h* represents the present value in the sweep H—H', and so on.

During each sweep of the ramp signal, the comparator 117 detects the occurrence of the foregoing coincidence between the ramp and data signal values, and produces an output signal upon each such occurrence. Specifically, the comparator 117 produces its output signal each time that the ramp signal value reaches or just slightly exceeds the then-existing value of the data signal. For example, the comparator output signal will appear during the sweep A—A' when the ramp signal reaches the value represented by the point *a*, which is the present value of the data signal for the sweep A—A'. The comparator 117 maintains each such output signal until the time that the ramp signal value drops below the data signal value during the following flyback period.

Accordingly, the foregoing can be summarized by stating that, for each sweep, the comparator 117 produces an output signal at the time that the ramp signal reaches the present value of the data signal, and terminates this output signal when the ramp signal drops below the data signal.

Further reference to FIG. 3 will shown that, during each sweep, the ramp signal also passes through a value equal to that which it had when it coincides with the data signal in the immediately previous sweep. For any given sweep, this value will, for convenience, be referred to herein as the previous value of the data signal. For the sweep B—B', for example, the point *a'* represents the previous value of the data signal, whereas for the sweep C—C', the point *b'* represents the previous value of the data signal. Likewise, the point *g'* represents the previous value of the data signal for the sweep H—H', and so on.

It is seen, therefore that a present value in a given sweep becomes a previous value one sweep later, and that, in any given sweep, the previous value is the present value from the immediately preceding or previous sweep. For example, the value represented by the points *a* and *a'* is the present value for the sweep A—A' and the previous value for the sweep B—B'. Also, for the sweep B—B', the point *a'* represents the previous value of the data signal while the point *b* represents the present value of this signal.

Continuing the explanation of the operation occurring during the sweep A—A', it has been noted that the comparator 117 produces an output signal when the ramp signal rises to the value *a*, which is the present value of the data signal for this sweep. This output signal is applied to the input of the delay line 118. The latter is selected to provide a delay period equal to the sweep period. For convenience of description, it will be assumed that this is the first application of a signal to the input of the delay line 118. Therefore, it will be further assumed that no output signal is being produced by the delay line 118 at this time.

The comparator output signal is also applied to the lower input of the EXCLUSIVE OR gate 119. However, since the present explanation begins with the detection of the point *a* in the sweep A—A', the effect of the comparator output signal on the gate 119 at this time can and will be disregarded to simplify the explanation.

The next event of importance occurs when, in the immediately succeeding sweep B—B', the ramp signal rises to the value *a*40, which is the previous value of the data signal for the sweep B—B'. At this instant, the delay line 118 applies an output signal to the upper input of the gate 119. This signal is, of course, the result of the application of the aforementioned signal to the input of the delay line 118 which occurred at the point *a* in the immediately previous sweep A—A'.

The gate 119 accomplishes the logic function of being on, and producing an output signal on the connection 121, only as long as a signal is being applied to either of its inputs, and of turning off, and hence terminating said output signal, upon the application of signals to both of its inputs simultaneously.

As a result, the aforementioned application of the delay line output signal to the upper gate input turns on the gate 119 and causes it to produce an output signal on the connection 121. This signal is applied to the corresponding one of the inputs of the master OR gate 7.

The gate 7 accomplishes the logic function of producing an output signal on the connection 23, or turning on, as long as a signal is applied to any of its inputs. Accordingly, the aforementioned signal on the connection 121 turns on the gate 7 and causes it to produce an output signal on the connection 23. As previously noted, the presence of a signal on the connection 23 causes the amplifier 6 to unblank the tube 4 for as long as such a signal persists. Consequently, at the point *a'* in the sweep B—B', the cathode ray beam starts to mark the sheet 12 along the sweep path B—B' as shown by the line 26 in FIG. 3.

As the ramp signal value continues to increase in the sweep B—B', it reaches the point *b*, which represents the present value of the data signal. At this instant, the comparator 117 produces its characteristic output signal. This signal is applied to the delay line 118 to represent the previous value of the data signal for the immediately following sweep C—C'. Said output signal is also applied to the lower input of the gate 119, where it turns off the latter and causes it to terminate the output signal on the connection 121 which was started at the point *a'* by the delay line output signal. Such termination turns off the gate 7, removes the signal from the connection 23, returns the tube 4 to the blanked condition, and terminates the marking action of the beam, and the line 26 on the sheet 12, at the present value point *b*.

In the same manner as just described, the beam produces a line 27 on the sheet 12 from the previous value point *b'* to the present value point *c* during the sweep C—C'. This action is repeated during each of the successive sweeps D—D' and E—E', producing on the sheet 12 the successive lines 28 and 29 as the delayed or previous value comparator output signal turns on the gates 119 and 7 and unblanks the tube 4, and the undelayed or present value comparator output turns off the gates 119 and 7 and blanks the tube 4, during each of these sweeps.

The foregoing applies to all sweeps for the time at which the data signal is increasing. When the latter is decreasing, a similar action takes place. Considering the sweep G—G', for example, it will be seen from FIG. 3 that the ramp signal now encounters the present value point *g* first. The resulting comparator output signal is now a turn-on signal for the gate 119, the gate 7, and the cathode ray beam, since no signal from the delay line 118 will yet have appeared in this sweep to turn on the gate 119. Accordingly, the tube 4 is unblanked at the point *g* in the sweep G—G', and the beam starts marking the line 30 on the sheet 12.

At the time that the ramp signal reaches the point *f'*, the delay line output signal due to the previous comparator action at point *f* appears at the upper input of the gate 119 and turns off the latter. This removes the signals from the connections 121 and 23, returns the tube 4 to the blanked condition, and terminates the line 30 at the previous value point *f'*. In the same manner as just described, the beam produces the successive lines 31, 32, and 33 during the successive sweeps, as the undelayed or present value comparator output signal unblanks the tube 4, and the delayed or previous value comparator output signal blanks the tube 4, during each of these sweeps.

To summarize the operation just described, it is noted that the tube 4 is unblanked in each sweep, and marks the sheet 12, only as long as the ramp signal value lies between the present and previous values of the data signal for that sweep. In each sweep, the tube 4 is unblanked by the arrival of the ramp signal at whichever of the previous and present values occurs earliest in that sweep, and is blanked again by the arrival of the ramp signal at the other of the previous and present values. As a result, for each sweep, the beam of the tube 4 marks the sheet 12 to produce a line extending between two points, the positions of which represent, respectively, the previous and the present values of the data signal. Thus, each successive line 26, 27, etc., is drawn between two points, the positions of which represent, respectively, the presently sampled and the immediately previously sampled values of the data signal. The FIG. 1 apparatus accomplishes this by remembering in each sweep the point in time in the immediately previous sweep at which the ramp signal corresponded to the data signal, and by turning the beam on or off, as the case may be, at this same point in time in he present or current sweep.

Figure 4:
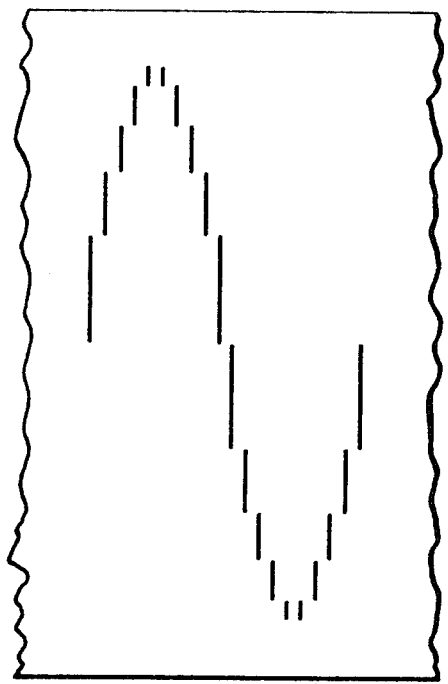
FIG. 4 is a representation of the display which would be produced for the signal of FIG. 2 by the apparatus of FIG. 1.

FIG. 4 illustrates the manner in which the aforementioned successively produced lines combine to form a recorded curve for the particular data signal involved. Specifically, the curve of FIG. 4 is typical of the record which would be produced by the FIG. 1 apparatus for the FIG. 2 data signal applied to the connection 115.

Figure 5:
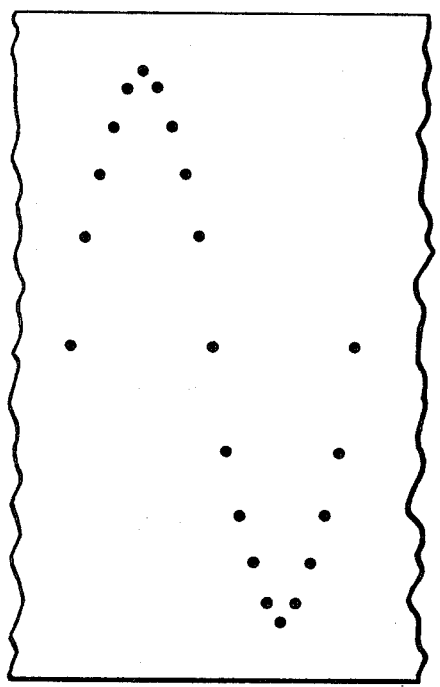
FIG. 5 is a representation of a typical display which would be produced for the signal of FIG. 2 by the known types of apparatus.

FIG. 5, on the other hand, is typical of the record which the previously known types of apparatus would produce for the data signal of FIG. 2. A comparison of the records of FIGS. 4 and 5 makes readily apparent the superior clarity and readability of the type of record produced in accordance with the present invention as compared with the dot record of the previously known arrangements. The practical advantage of the FIG. 4 type of record over the prior type of record shown in FIG. 5 is believed to be obvious, particularly in the case of a plurality of widely swinging, overlapping curves of irregular waveform. In such situations, a record of the type shown in FIG. 5 can well amount merely to a chaotic, meaningless jumble of dots, whereas a record of the type shown in FIG. 4 permits each of the curves involved to be readily followed.

Although the foregoing typical curve or trace illustrated in FIG. 4 has, for descriptive purposes, been shown with adjacent lines axially spaced apart, the FIG. 1 apparatus can, in practice, be operated so as to produce curves wherein adjacent lines just touch each other or even overlap. The desired spacing between adjacent lines can be obtained in practice by a proper choice of the sweep rate and the size of the spot produced by the tube 4. This spot size determines, of course, the width of the lines produced by the tube 4, and can be set by the same techniques employed for setting the spot size in cathode ray oscilloscopes.

If desired, the FIG. 1 apparatus can readily be made to produce time lines on the sheet 12 similar to those produced by galvanometer-type oscillographs on their record sheets. The production of such time lines on the sheet 12 can be achieved simply by unblanking the tube 4 throughout one sweep, or one flyback, at appropriate intervals. Similarly, amplitude reference coordinates or grid lines, similar to those produced by the known oscillographs, can be placed on the sheet 12 simply by unblanking the tube 4 at regularly spaced intervals across the sheet 12. The lateral position of each recorded curve and its axis on the sheet 12 can, of course, be set by introducing an appropriate offset into the comparison operation of the corresponding comparator. Although, in order to simplify the present disclosure, no means has been shown in FIG. 1 for handling the sheet 12 after it has moved past the strip 11, it is contemplated that the same record sheet handling techniques employed in the known oscillographs can be applied to the FIG. 1 apparatus as desired. For example, the sheet 12 can, if desired, be reeled onto a takeup roll after passing the strip 11, or can, if desired, be allowed to spill out of a slot in the casing housing the FIG. 1 apparatus.

Although the foregoing description treated the operation of the FIG. 1 apparatus as though only the channel 1 were in use, the operation of the FIG. 1 apparatus is essentially the same in the presence of data signals applied simultaneously to all three channels. In this case, the gate 7 is maintained on, and the tube 4 unblanked, as long as any signal is being applied to the gate 7 inputs over any of the connections 121, 221, 321. Therefore, as the ramp signal value is swept upward during each sweep, this value successively coincides with the previous and present value points for the three data signals, and the cathode ray beam draws an individual line between the previous and present value points for each of these three signals during each sweep.

It is to be understood that the method and apparatus according to the present invention need not be limited to the handling of three data signals, as is done by the exemplary apparatus of FIG. 1, but that the invention is applicable for the simultaneous production of curves for a greater or a lesser number of data signals. Also, the teachings of the invention are applicable to the production of a display in the form of an indication, as well as to the disclosed production of a display in the form of a record. Moreover, the invention is applicable in the use of other than a cathode ray beam as the display marking means, and to the use of other than a photosensitive type of display medium. For example, the invention is applicable to apparatus wherein the marking means is of the magnetic core and pin type, and marks a magnetically responsive record medium.

Figure 6:
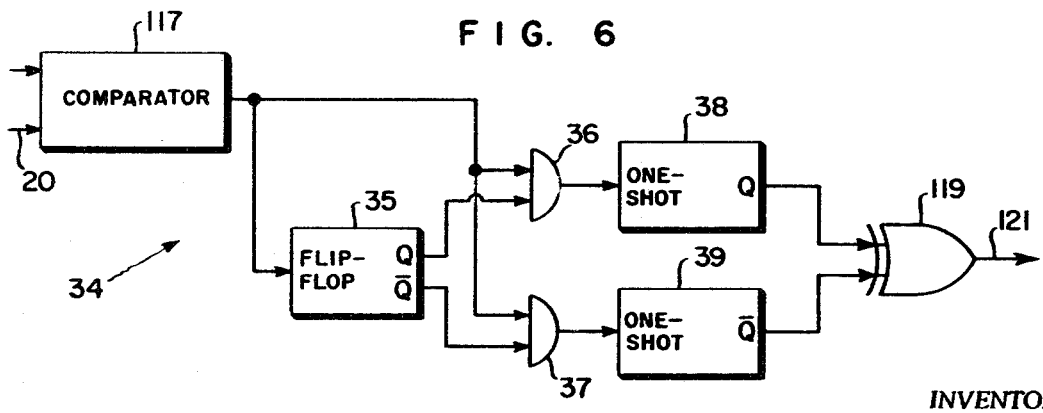
FIG. 6 is a diagram of a modification of certain portions of the apparatus of FIG. 1.

The Apparatus of FIG. 6

Any or all of the channels 1, 2, and 3 of the FIG. 1 apparatus may be modified to employ other than a delay line for providing the memory action described hereinbefore. An example of such a modification is shown in FIG. 6, wherein the channel 1 is shown in modified form as the channel 34. The latter includes the amplifier 116, the comparator 117, and the gate 119 as before, but the delay line 118 has been replaced by a binary element or flip-flop 35, AND gates 36 and 37, and monostable delay multivibrators or one-shots 38 and 39. Each of these one-shots is constructed to have a period of one sweep period, and hence to provide a delay effect of one sweep period duration each time that it is triggered, as will be explained more fully hereinafter.

In the channel 34, the output of the comparator 117 is connected to the clock input of the flip-flop 35 and to one input of each of the gates 36 and 37. The upper or Q output of the flip-flop 35 is connected to the remaining input of the gate 36, while the lower or $\bar{Q}$ output of the flip-flop 35 is connected to the remaining input of the gate 37. The output of the gate 36 is connected to the trigger input of the one-shot 38, the Q output of which is connected to one of the inputs of the gate 119. Finally, the output of the gate 37 is connected to the trigger input of the one-shot 39, the $\bar{Q}$ output of which is connected to the remaining input of the gate 119.

As a result of the foregoing connections to the one-shots 38 and 39, the one-shot 38 does not produce any output signal until it receives an input or trigger signal from the gate 36. At that time, the one-shot 38 produces an output signal for a time equal to one sweep period, which signal is applied to the gate 119. Conversely, the one-shot 39 normally produces an output signal which is applied to the gate 119. This signal is interrupted for a period equal to one sweep period each time that the one-shot 39 receives a trigger signal from the gate 37. Thus, the one-shot 38 provides a timed signal period each time that it is triggered, whereas the one-shot 39 provides a timed no-signal period each time that it is triggered.

Operation of the FIG. 6 Apparatus

As before, the comparator 117 produces an output signal in each sweep at the time or point at which the ramp signal reaches or just exceeds the present value of the applied data signal. For the present description, the first action to be described will be that which occurs as a result of the production of the comparator output signal at the present value point a of the curve of FIG. 3.

The comparator output signal produced when the point a is reached is applied to the input of the flip-flop 35 and to the upper inputs of the gates 36 and 37. Let it be assumed that this signal causes the flip-flop 35 to switch to the state in which it produces a signal in its Q output. This signal, in combination with the signal directly from the comparator 117, turns on the gate 36. There is, of course, no signal produced in the $\overline{Q}$ output of the flip-flop 35 at this time, whereby the gate 37 is off and no signal is applied to the input of the one-shot 39. It will be assumed that the latter is at this time in its normal state, wherein it applies a signal to the lower input of the gate 119. Therefore, at the time that the point a is reached, the gate 119 is on.

The above-noted turning on of the gate 36 at the point a causes the latter to apply a signal to the input of the one-shot 38. Upon receiving this signal, the one-shot 38 produces its output signal of one sweep period duration. The appearance of this signal turns off the gate 119, since the output signal from the one-shot 39 is already being applied to the gate 119. Therefore, the gate 119 is turned off as the ramp signal reaches the point a.

The next event of importance occurs when, in the following sweep B—B', the ramp signal reaches the point a', which represents the previous value of the data signal. This occurs exactly one sweep period after the point a was reached in the immediately previous sweep A—A'. Accordingly, at the instant at which the point a' is reached, the timed signal period of the one-shot 38 expires, and the output signal of the one-shot 38 disappears. But the one-shot 39 is still applying a signal to the gate 119, since nothing has occurred to trigger the one-shot 39 into its no-signal condition. Therefore, at the point a', the gate 119 is turned on, the tube 4 is unblanked, and the tube beam starts to mark the sheet 12 along the sweep path B—B' as shown by the line 26 in FIG. 3.

As the ramp signal value continues to increase in the sweep B—B', it reaches the point b, which represents the present value of the data signal for this sweep. At this point, the comparator 117 once more produces an output signal. This signal reverses the flip-flop 35, so that the latter now produces a signal in its $\overline{Q}$ output instead of in its Q output. This signal, in cooperation with the output signal directly from the comparator 117, turns on the gate 37, which then applies an output signal to the one-shot 39. This triggers the one-shot 39 and causes the output signal of the latter to disappear for a period equal to one sweep period, as previously explained.

The disappearance of the output signal of the one-shot 39 leaves the gate 119 with no input signals, since the output signal of the one-shot 38 terminated at the point a'. Therefore, at the present value point b, the tube 4 becomes blanked once more, and its marking action is terminated. Consequently, the line 26, which started at the point a', terminates at the point b, as in the cause of the FIG. 1 apparatus.

During the following sweep C—C', the ramp signal reaches the point b' exactly one sweep period after the point b was reached in the immediately previous sweep B—B'. Accordingly, at the instant that the point b' is reached, the timed no-signal period of the one-shot 39 expires, and the output signal of the one-shot 39 reappears and turns on the gate 119. This unblanks the tube 4 and causes the latter to start producing the line 27 on the sheet 12 at the point b'.

When the point c is subsequently reached in the sweep C—C', the comparator output signal then produced reverses the flip-flop 35, which then turns on the gate 36. This causes the output of the one-shot 38 to be produced. Since there are now two signals being applied to the gate 119, the latter turns off, terminating the line 27 at the point c.

The foregoing operation, which applies to all sweeps occurring while the data signal is increasing, may be summarized by noting that, in alternate sweeps, such as the sweeps A—A', C—C', and E—E', the tube 4 is unblanked by the expiration of the timed no-signal period of the one-shot 39, and is reblanked by the start of the timed signal period of the one-shot 38. Also, in the intervening sweeps, such as the sweeps B—B', and D—D', the tube 4 is unblanked by the expiration of the timed signal period of the one-shot 38, and is reblanked by the start of the timed no-signal period of the one-shot 39.

The operation of the FIG. 6 apparatus when the data signal is decreasing is similar to the operation described above. Considering the sweep G—G', for example, the arrival of the ramp signal at the point g switches the flip-flop 35 to its Q output condition, turns on the gate 36, and starts the timed output signal period of the one-shot 38. The one-shot 39 is now in one of its timed no-signal periods, whereby the output signal of the one-shot 38 turns on the gate 119 and unblanks the tube 4, starting the marking of the line 30 at the point g.

The ramp signal then arrives at the point f' at the instant that the timed no-signal period of the one-shot 39 ends. The resulting appearance of the output signal of the one-shot 39 turns off the gate 119 and reblanks the tube 4, ending the line 30 at the point f'.

In the following sweep H—H', the arrival of the ramp signal at the point h switches the flip-flop 35 to its $\overline{Q}$ output condition, turns on the gate 37, and starts the next timed no-signal period of the one-shot 39. This disappearance of the output signal of the one-shot 39 turns on the gate 119 and unblanks the tube 4, since the one-shot 38 is still in its timed signal period. The ramp signal then arrives at the point g' at the instant that the last-mentioned period expires. This leaves no signal applied to the gate 119, whereby the latter turns off and reblanks the tube 4 at the point g'. In this way, the line 31 is drawn between the points h and g'.

The foregoing operation, which applies to all sweeps occurring while the data signal is decreasing, may be summarized by noting that, in alternate sweeps, such as the sweeps G—G' and I—I', the tube 4 is unblanked by the start of the timed signal period of the one-shot 38, and is reblanked by the expiration of the timed no-signal period of the one-shot 39. Also, in the intervening sweeps, such as the sweeps H—H' and J—J', the tube 4 is unblanked by the start of the timed no-signal period of the one-shot 39, and is reblanked by the expiration of the timed signal period of the one-shot 38.

It can be seen from the foregoing that the operation of the tube 4 of the FIG. 1 apparatus when utilizing the channel 34 of FIG. 6 is identical to the operation of the tube 4 produced when the channel 1 is utilized. Accordingly, as in the case of the channel 1, the channel 34 causes the tube 4 to be unblanked and to mark the sheet 12 in each sweep only as long as the ramp signal lies between the present and previous values of the data signal for that sweep. As before, the tube 4 is unblanked by the arrival of the ramp signal at whichever of the previous and present values occurs earliest in the sweep, and is reblanked by the arrival at the other of these values. Thus, the channel 34 causes the tube 4 to draw each of the successive lines 26, 27 etc., between two points, the positions of which represent, respectively, the presently sampled and the immediately previously sampled values of the data signal. The channel 34, like the channel 1, accomplishes this by remembering in each sweep the point in time in the immediately previous sweep at which the ramp signal corresponded to the data signal. In the channel 34, however, this memory action is provided by the alternate operation of the one-shots 38 and 39.

Figure 7:
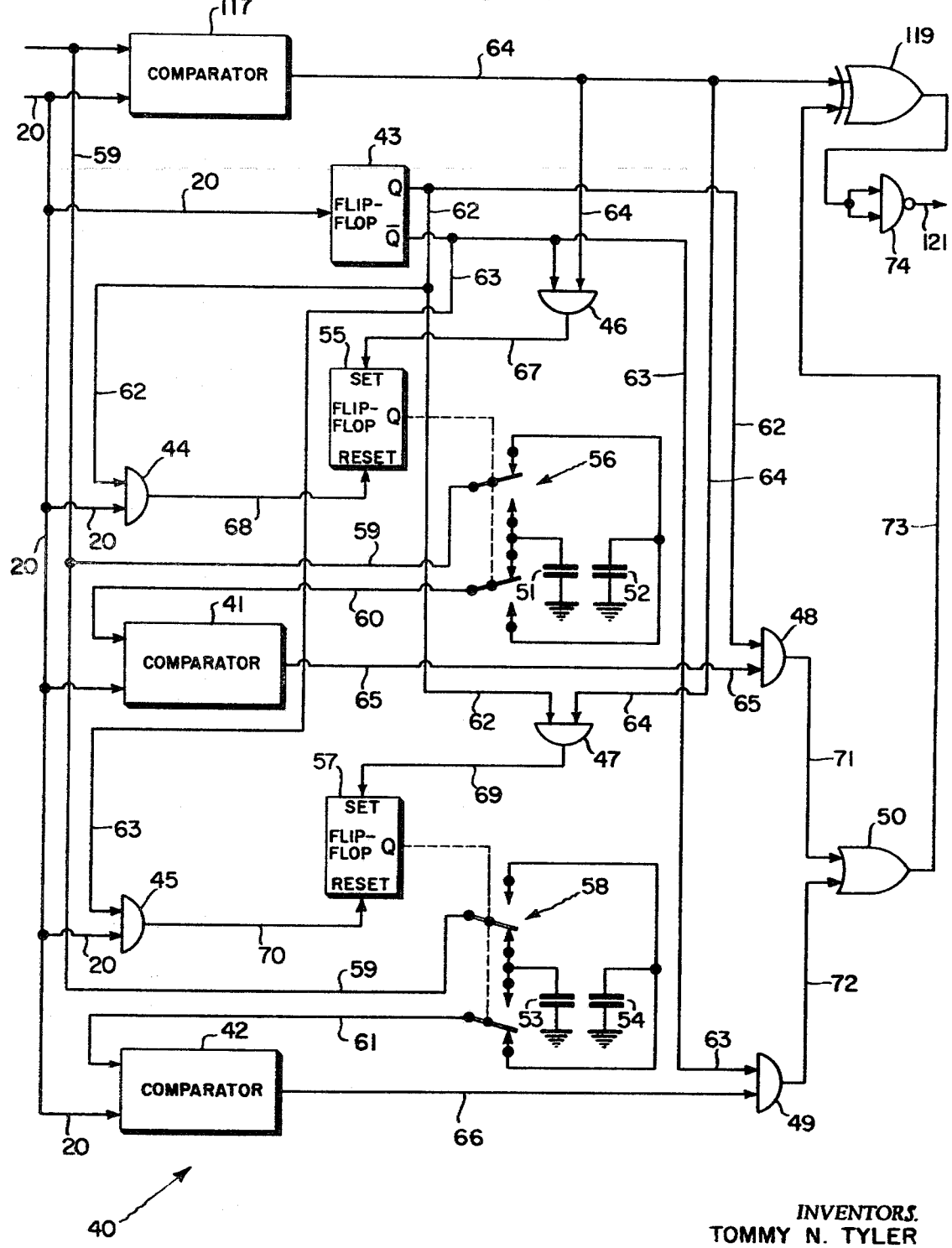
FIG. 7 is a diagram of another modification of said portions of the apparatus of FIG. 1.

The Apparatus of FIG. 7

Any or all of the channels 1, 2, and 3 of the FIG. 1 apparatus may be modified so as to operate by remembering for each sweep the actual previous value itself, instead of by remembering its time of occurrence. An example of such a modified channel is shown in FIG. 7, wherein the channel 1 is shown in modified form as the channel 40. The latter includes the comparator 117 and the gate 119 as before, and also includes a first previous value comparator 41, a second previous value comparator 42, a sequencing control flip-flop 43, AND gates 44 through 49, OR gate 50, capacitors 51 through 54, a latching flip-flop 55 controlling a switch 56, and a latching flip-flop 57 controlling a switch 58. The comparators 41 and 42 can well be identical to the comparator 117.

In the channel 40, the data signal is applied to the comparator 117 as before, and is also applied by way of a connection 59 to the switches 56 and 58. Also, the connection 20 applies the ramp signal to not only the comparator 117, but also to the clock input of the flip-flop 43, to one of the inputs of each of the gates 44 and 45, and to one of the inputs of each of the comparators 41 and 42. The other input of the comparator 41 is connected to the switch 56 by a connection 60, while the other input of the comparator 42 is connected to the switch 58 by a connection 61.

The upper or Q output of the flip-flop 43 is connected by a connection 62 to the remaining input of the gate 44, and to one of the inputs of each of the gates 47 and 48. The lower or $\overline{Q}$ output of the flip-flop 43 is connected by a connection 63 to the remaining input of the gate 45, and to one of the inputs of each of the gates 46 and 49. The output of the comparator 117 is connected by a connection 64 to the remaining inputs of each of the gates 46 and 47, as well as to one input of the gate 119. The output of the comparator 41 is connected by a connection 65 to the remaining input of the gate 48, while the output of the comparator 42 is connected by a connection 66 to the remaining input of the gate 49.

The output of the gate 46 is connected by a connection 67 to the upper or SET input of the flip-flop 55, while the lower or RESET input of the latter is connected to the output of the gate 44 by a connection 68. Similarly, the output of the gate 47 is connected by a connection 69 to the SET input of the flip-flop 57, while the RESET input of the latter is connected by a connection 70 to the output of the gate 45. The outputs of the gates 48 and 49 are connected to the two inputs of the gate 50 by respective connections 71 and 72, while the output of the gate 50 is connected to the remaining input of the gate 119 by a connection 73.

The capacitors 51 and 52 are so connected to the switch 56 that, when the latter is in the up condition shown in FIG. 7, the capacitor 51 is connected to the input of the comparator 41 by way of the connection 60, while the capacitor 52 is connected to the data signal connection 59. When the switch 56 is in its opposite or down condition, the capacitor 51 is connected to the data signal connection 59, and the capacitor 52 is connected to the input of the comparator 41.

Similarly, the capacitors 53 and 54 are so connected to the switch 58 that, when the latter is in its up condition, the capacitor 53 is connected to the input of the comparator 42 by way of the connection 61, while the capacitor 54 is connected to the data signal connection 59. When the switch 58 is in its opposite or down condition, the capacitor 53 is connected to the data signal connection 59, and the capacitor 54 is connected to the input of the comparator 42.

The output of the gate 119 is not connected directly to the connection 121 as it is in the case of the channel 1. Instead, the output of the gate 119 is connected to both of the inputs of a NAND gate 74, the output of which is connected to the connection 121. The gate 74 provides the usual signal-inverting function.

As mentioned above, the switches 56 and 58 are controlled by the respective latching flip-flops 55 and 57. Specifically, it will be assumed that a signal applied to the SET input of the flip-flop 55 causes the switch 56 to assume the up condition, whereas a signal applied to the RESET input of the flip-flop 55 causes the switch 56 to assume the down condition. Similarly, it will be assumed that a signal applied to the SET input of the flip-flop 57 causes the switch 58 to assume the down condition, whereas a signal applied to the RESET input of the flip-flop 57 causes the switch 58 to assume the up condition.

Although the switches 56 and 58 have been shown in FIG. 7 as being contact-type switches in order to simplify the disclosure, it is noted that, in practice, these switches may well be semiconductor switching circuits, such as the known switching circuits employing field effect transistors. It is also noted that the showing of the connection of the lower terminals of the capacitors 51, 52, 53, and 54 to ground has been made to indicate that these terminals are connected to the common connection for the inputs of the comparators 117, 41, and 42.

Operation of the FIG. 7 Apparatus

In the channel 40, the comparator 117 functions as a present value comparator as before, while the comparators 41 and 42 function as previous value comparators on an alternative basis. Thus, during each sweep, the comparator 117 provides an output signal on the connection 64 when the ramp signal reaches the present value of the data signal for that sweep. During each of alternate sweeps, such as the sweeps A—A', C—C', etc., the flip-flop 43 produces a signal in its $\overline{Q}$ output which renders the comparator 41 active during that sweep. During each intervening sweep, such as one of the sweeps B—B', D—D', etc., the flip-flop 43 produces a signal in its Q output which renders the comparator 42 active during that sweep.

Considering the action which occurs during one of said alternate sweeps, it is noted that, during this sweep, the comparator 41 compares the ramp signal to a previous value signal as stored on one of the capacitors 51 and 52 from the previous sweep. When the ramp signal reaches this stored previous value, the comparator 41 produces an output signal on the connection 65. The comparator 117 also produces its output signal on the connection 64 during this sweep. The one of these two output signals to be produced first in the sweep unblanks the tube 4 by way of the gates 119 and 74, while the one of these two output signals to be produced last in the sweep reblanks the tube 4. During this same sweep, the comparator 42 is idle, but one of the capacitors 53 and 54 is storing a signal equal to the present value detected by the comparator 117.

During the immediately following sweep, which is one of said intervening sweeps, the comparator 42 compares the ramp signal to the said signal stored on one of the capacitors 53 and 54, which signal is now a previous value signal for the sweep being considered. When the ramp signal reaches this stored previous value, the comparator 42 produces an output signal on the connection 66. The comparator 117 also produces its output signal on the connection 64 during this sweep. Of these two output signals, the first to be produced unblanks the tube 4 and the last to be produced reblanks the tube 4. During this same sweep, the comparator 41 is idle, but one of the capacitors 51 and 52 is storing a present value signal to be used as the previous value signal in the next sweep.

In the performance of the foregoing operation, the flip-flop 55 is set by the gate 46 during each sweep in which the comparator 41 is inactive, this action occurring when the comparator 117 detects the present value of the data signal. Similarly, the flip-flop 57 is set by the gate 47 at the time of the present value detection in each sweep in which the comparator 42 is inactive. Each of the flip-flops 55 and 57 is reset at the end of the sweep in which the associated one of the comparators 41 and 42 has been active.

As a result of the foregoing operation, the channel 40 causes the tube 4 to be unblanked and to mark the sheet 12 in each sweep only as long as the ramp signal lies between the present and previous values of the data signal for that sweep. Thus, the beam of the tube 4 produces successive lines on the sheet 12 like the lines 26, 27, etc., of FIG. 3. The channel 40 accomplishes this by remembering in each sweep, by means of the appropriate one of the capacitors 51, 52, 53, and 54, the previous value of the data signal, and by unblanking or reblanking the tube 4 when the ramp signal reaches this value.

In summary, it is seen that the described method and apparatus according to the present invention produce substantially continuous, graphically displayed curves from information obtained by repeatedly sampling the values of data signals. Each of these curves consists of a series of successively produced lines produced on a display medium, such as a record sheet. Each of these lines is produced between two points, one of which represents the presently sampled value of the corresponding data signal, that is, the value which this data signal has when sampled at the time at which this line is being produced. The other of said points represents the immediately previously sampled value of this data signal, that is, the value which this data signal had when it was last sampled. This enables a relatively simple arrangement, employing only a single display medium marking means, to produce simultaneously a plurality of curves for a corresponding plurality of data signals, and yet to make each of these curves appear as a continuous trace.

It is believed that the foregoing shows clearly that the method and apparatus of the present invention fulfill the objects set forth hereinbefore.

Figure 8:
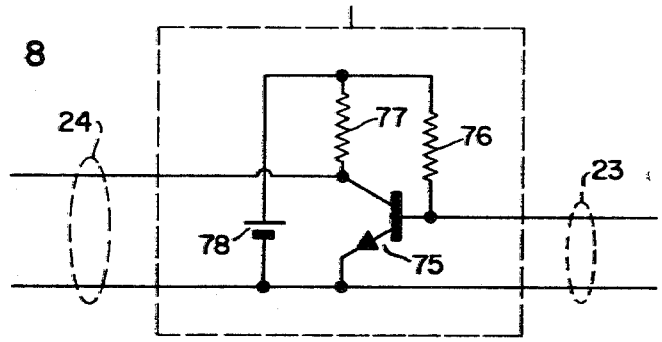
FIG. 8 is a diagram of a device which is useful as the unblanking amplifier of the FIG. 1 apparatus.

The Apparatus of FIG. 8

An example of a specific device which can be used as the unblanking amplifier 6 is illustrated in FIG. 8. In that figure, the amplifier 6 is shown as including a transistor 75, resistors 76 and 77, and a power source, shown as a battery 78. In this amplifier, one conductor of the input connection 23 is connected to the base of the transistor 75, while the other conductor of the connection 23 is connected to the transistor emitter and to one of the conductors of the output connection 24. The other conductor of the latter is connected to the transistor collector. The resistor 76 connects the transistor base to the positive terminal of the battery 78, while the resistor 77 connects the transistor collector to said positive terminal. The negative terminal of the battery 78 is connected to the transistor emitter.

Operation of the FIG. 8 Apparatus

As previously explained, the device 6 serves to unblank the tube 4 at all times at which a signal is present on the connection 23. The form of the device 6 shown in FIG. 8 accomplishes this in the following manner. When no signal is present on the input connection 23, the transistor 75 is off, and no signal is applied over the connection 24 to affect the normally blanked condition of the tube 4. When a signal appears on the connection 23, however, this signal turns on the transistor 75. The latter then drives the cathode 9 of the tube 4 sufficiently negative to cause the tube to become unblanked.

Figure 9:
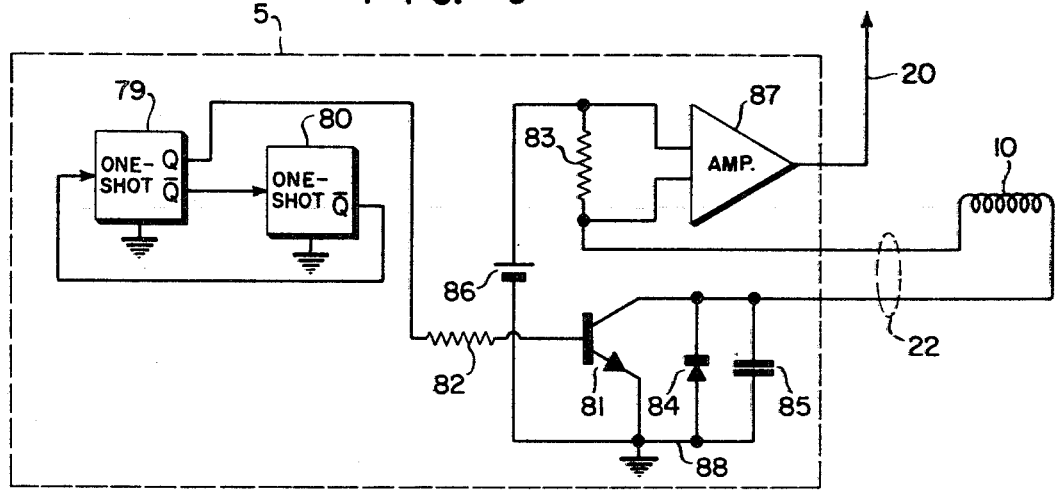
FIG. 9 is a diagram of a device which is useful as the generator of the FIG. 1 apparatus.

The Apparatus of FIG. 9

An example of a specific device which can be used as the ramp and deflection signal generator 5 is illustrated in FIG. 9. In that figure, the generator 5 is shown as including one-shots 79 and 80, a transistor 81, resistors 82 and 83, a diode 84, a capacitor 85, a power source, shown as a battery 86, and a ramp signal amplifier 87. The one-shot 79 is constructed to have a period equal to the desired forward sweep time of the signals to be produced by the generator 5, while the one-shot 80 is constructed to have a period equal to the desired flyback time of said signals. The sum of the periods of the one-shots 79 and 80 is thus the sweep period for the apparatus using the generator 5.

The $\overline{Q}$ output of the one-shot 79 is connected to the trigger input of the one-shot 80, while the $\overline{Q}$ output of the latter is connected to the trigger input of the one-shot 79. The Q output of the latter is connected through the resistor 82 to the base of the transistor 81, while the emitter thereof is connected to a common connection 88 which is common to the circuits of the one-shots 79 and 80.

The collector of the transistor 81 is connected in series with the cathode ray tube deflection coil 10 (via the connection 22) and the resistor 83 to the positive terminal of the battery 86, the negative terminal of which is connected to the connection 88. Each of the diode 84 and the capacitor 85 is connected between the transistor collector and emitter. The input of the amplifier 87 is connected across the resistor 83, while the output of this amplifier is connected to the ramp signal connection 20.

Operation of the FIG. 9 Apparatus

As previously explained, the generator 5 produces the sweep signal which is supplied to the deflection coil 10 by the connection 22, and also produces the ramp signal which is supplied to the comparators, etc., by the connection 20. The form of the device 5 shown in FIG. 9 accomplishes this in the following manner.

The interconnected one-shots 79 and 80 produce through the resistor 82 a pulse signal which is high for the aforementioned forward sweep time and low for the aforementioned flyback time. This signal drives the base of the transistor 81 which in turn, with the cooperation of the diode 84 and the capacitor 85, sends the necessary deflection current through the coil 10 and the resistor 83. This action is analogous to that employed to provide the sweep in television receivers.

The current flowing through the coil 10 and the resistor 83, and the voltage across the latter, are proportional to the deflection of the cathode ray tube beam. This voltage is amplified by the amplifier 87 to become the ramp signal on the connection 20.

Figure 10:
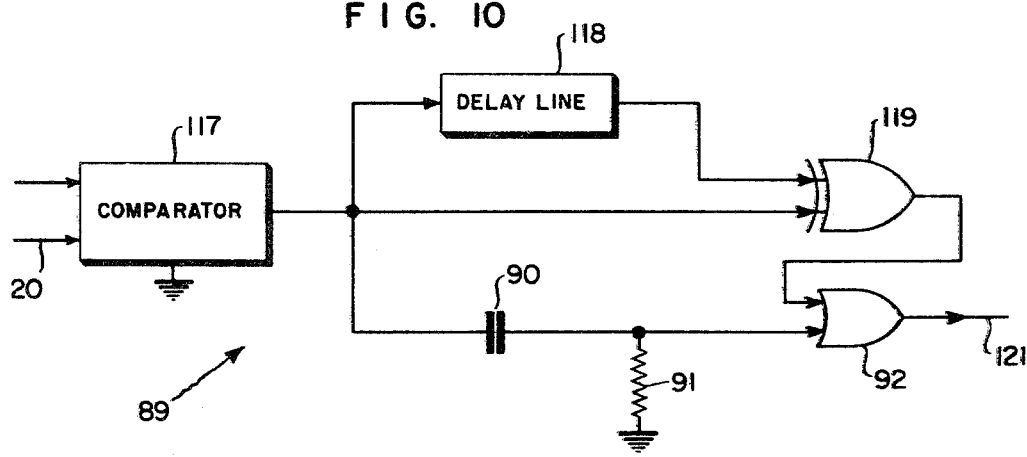
FIG. 10 is a diagram of a further modification of the apparatus of FIG. 1.

The Apparatus of FIG. 10

As explained hereinbefore in connection with the apparatus of FIG. 1, a present value comparator output signal and a previous value signal are applied to the gate 119 during each sweep. The first of these signals to arrive at the gate 119 serves to turn it on and to unblank the tube 4, and the second of these signals to arrive at the gate 119 serves to turn it off and to reblank the tube 4. When the value of the data signal is changing between successive sweeps, the action described causes the beam of the tube 4 successively to mark the sheet 12 between the previous and present values of the data signal, as previously noted.

When the data signal activity is such that the previous and present values for a given sweep are equal, the previous value and present value signals arrive at the gate 119 simultaneously. Such a condition occurs, for example, when the value of the data signal is zero or is constant at some finite value. Such simultaneous arrival of the two signals at the gate 119 prevents the latter from turning on in the sweep being considered, with the result that no mark is made on the sheet 12 for that sweep. Thus, when such a condition prevails for a number of sweeps, there will be no record or trace produced on the sheet 12 during that time, notwithstanding the fact that the data signal may have a finite value at that time. This absence of a trace when the data signal has a steady value may be undesirable in some instances.

Any or all of the channels described herein may be modified, however, so as to cause the beam of the tube 4 to mark the sheet 12 and to produce a trace thereon even when the value of the associated data signal is not changing. Such a trace, or portion of a trace, is usually referred to as a static trace. An example of such channel modification to provide static traces is shown in FIG. 10, wherein the channel 1 is shown in modified form as the channel 89.

In the channel 89, the components of the channel 1 are augmented by a capacitor 90, a resistor 91, and an OR gate 92. The output of the gate 119 is connected to one of the inputs of the gate 92, the output of which is connected to the connection 121. Thus, the output of the gate 119 is not connected directly to the connection 121 as before, but is connected to this connection by way of the gate 92.

The capacitor 90 is connected between the output of the comparator 117 and the remaining input of the gate 92. The resistor 91 is connected between the last-mentioned input and the common connection for the channel circuitry. As a result, the appearance of a comparator output signal causes a pulse to appear across the resistor 91 and to be applied to the said last-mentioned input of the gate 92. Accordingly, a signal is produced on the connection 121 either by the presence of an output signal from the gate 119 or by the presence of a signal across the resistor 91.

Operation of the FIG. 10 Apparatus

As long as the value of the data signal is changing between successive sweeps, the operation of the channel 89 is the same as that of the channel 1 as described hereinbefore. That is, the gate 119 is turned on in each sweep for the period in which the ramp signal lies between the present and previous data signal values, whereby the output of the gate 119 turns on the gate 92 and puts an unblanking signal on the connection 121 throughout each of these periods.

The appearance of the comparator output signal during each of the above-noted sweeps causes a pulse signal to appear across the resistor 91, due to the differentiating action of the capacitor 90 and the resistor 91. For the situation presently being considered, however, the practical effect of these pulse signals can generally be disregarded, since these signals usually will have disappeared before the output of the gate 119 has actually disappeared. The reason for this is that these pulses will generally be of extremely short duration, of the order of one trace width, and that the various logic devices, such as the gate 119, will generally introduce certain inherent time delays.

During any sweep in which there is no difference between the previous and present data signal values, there is no output signal from the gate 119 to turn on the gate 92, as noted above. In such a sweep, the pulse signal produced across the resistor 91 upon the appearance of the comparator output signal is then effective to turn on the gate 92, and to place an unblanking signal on the connection 121, for the duration of the pulse. Accordingly, the sheet 12 is marked in such a sweep at a point representing the present value of the data signal. By the paper choice of the time constant of the circuit including the capacitor 90 and the resistor 91, said mark can be made to have the length desired, such as a length equal to the width of the cathode ray beam at the existing sweep frequency. These marks will be produced successively as long as the data signal value remains constant, and will form a static trace which represents the existing constant value of the data signal.

Typical Devices

By way of illustration and example, and not by way of limitation, it is noted that the several elements or devices shown in symbolic form in FIGS. 1, 6, 7, 9, and 10 may, if desired, be of the commercially available types listed below:

| | |
|---|---|
| Tube 4 | Sylvania Electric Products, Inc. Type SC-3800 |
| OR Gates 7, 50, 92 | Sprague Electric Co. Type SU-331 |
| Sheet 12 | Honeywell part 0100717 |
| Amplifiers 87, 116, 216, 316 | Transitron Electronic Corp. Type TOA-2741 |
| Comparators 41, 42, 117, 217, 317 | Transitron Electric Corp. Type TDC-1710 |
| Delay Lines 118, 218, 318 | ESC Electronics Corp. Type 4A502 |
| EXCLUSIVE OR Gates 119, 219, 319 | Sprague Electric Co. Type SE-440J |
| Flip-flops 35, 43 | Sprague Electric Co. Type SE125J |
| Flip-Flops 55, 57 | Motorola Type MC831P |
| AND Gates 36, 37, 44–49 | Sprague Electric Co. Type SU305 |
| One-shots 38, 39, 79, 80 | Sprague Electric Co. Type SE161J |
| NAND Gate 74 | Sprague Electric Co. Type NE4POJ |

The embodiments of the invention in which an exclusive property or privilege is claimed are defined as follows:

1. The method of producing a graphic display of the condition of a signal, comprising the steps of
   analyzing said signal to derive a succession of values, each of which represents a successive condition of said signal, and
   producing successive substantially parallel lines on a display medium, each of said lines being substantially continuous and extending between two points, the positions of which represent, respectively, a corresponding two, consecutively derived ones, of said values.

2. The method of claim 1, wherein the last-recited step consists of repeatedly marking a record medium by a recording means to record said lines on said medium, and wherein there is provided the additional step of moving said record medium relative to said recording means in a direction substantially at right angles to said lines.

3. The method of claim 1, wherein the first-recited step consists of repeatedly sampling the value of said signal, wherein said successively derived values represent successive sampled values of said signal, and wherein the positions of the said points terminating each of said lines represent, respectively, the presently sampled value of said signal and the immediately previously sampled value of said signal.

4. The method of claim 3, wherein said sampling step includes
   repeatedly sweeping the value of a second signal progressively between first and second values at a predetermined rate,
   comparing the value of the first-mentioned signal to the value of said second signal during each of said sweeps of the latter, and
   detecting, for each of said sweeps, the occurrence of a predetermined relationship between the values of said first-mentioned and second signals,
and wherein said producing step consists of producing, for each of said sweeps, one of said lines on a display medium, each of said lines extending between two points the positions of which represent respectively, the values of said first-mentioned signal at the times of the occurrence of said relationship for the present one and the immediately previous one of said sweeps.

5. The method of claim 4, wherein the last-recited step includes
   activating a display medium marking means during each of said sweeps only for the time period in which the value of said second signal lies between the values had by said first-mentioned signal at the times of the occurrence of said relationship for the present one and the immediately previous one of said sweeps, and
   applying said second signal to effectively sweep said marking means across said display medium in synchronism with said sweeping of said second signal value.

6. The method of claim 5, wherein the last-mentioned step includes
   producing a cathode ray tube beam during each of said sweeps only for the time period in which the value of said second signal lies between the values had by said first-mentioned signal at the times of the occurrence of said relationship for the present one and the immediately previous one of said sweeps, and
   sweeping said beam across the face of said tube in synchronism with said sweeping of said second signal.

7. The method of claim 5, wherein said activating step includes
   producing a first output signal upon each detection of said occurrence,
   producing a second output signal subsequent to the production of each of said first output signals by a time period equal to the reciprocal of said sweep rate,
   activating said display medium marking means during each of said sweeps upon the production of the one of said first and second output signals which is produced earliest during that sweep, and
   deactivating said marking means upon the production of the other of said output signals during the last-mentioned sweep.

8. The method of claim 5, wherein said activating step includes
   changing an output signal from a first to a second value for a period equal to the reciprocal of said sweep rate upon every other detection of said occurrence,
   changing another output signal from a first to a second value for a period equal to the reciprocal of said sweep rate upon every intervening detection of said occurrence,
   activating said display medium marking means during each of said sweeps upon the occurrence of the first output signal change to occur during that sweep, and
   deactivating said marking means upon the occurrence of the second output signal change to occur during the last-mentioned sweep.

9. The method of claim 5, wherein said activating step includes producing a first output signal upon each detection of said occurrence, storing in each sweep a memory value representative of the value of said first-mentioned signal at the time of the production of said first output signal during that sweep, comparing in each sweep the value of said second signal and said memory value as stored during the immediately preceding sweep, detecting, for each of said sweeps, the occurrence of a predetermined relationship between the last-mentioned two values, producing a second output signal upon each detection of the last-mentioned occurrence, activating said display medium marking means during each of said sweeps upon the production of the one of said first and second output signals which is produced earliest during that sweep, and deactivating said marking means upon the production of the other of said output signals during the last-mentioned sweep.

10. The method of providing a graphic display representative of the values of each of a plurality of data signals, comprising the steps of repeatedly producing a comparison signal, simultaneously comparing all of said data signals to said comparison signal during each production of the latter, and producing, for each of said data signals during each production of said comparison signal, a substantially continuous line extending between two points on a common display medium, the positions of which points represent, respectively, a function of the value of the corresponding data signal during the present one and the immediately previous one of said productions of said comparison signal.

11. Apparatus for producing a graphic display of the condition of a data signal, comprising first means connected to the source of said signal for deriving a succession of values, each of which represents a successive condition of said signal, and second means connected to said first means for producing successive substantially parallel lines on a display medium, each of said lines being substantially continuous and extending between two points, the positions of which represent, respectively, a corresponding two, consecutively derives ones, of said values.

12. Apparatus as specified in claim 11, wherein said display medium is a record medium, wherein said second means includes recording means and means to cause said recording means to record said lines on said record medium, and wherein there is included means for moving said record medium relative to said recording means in a direction substantially at right angles to said lines.

13. Apparatus as specified in claim 11, wherein said first means includes sampling means for repeatedly sampling the value of said signal to cause said successively derived values to represent successive sampled values of said signal, and wherein the positions of the said points terminating each of said lines represent, respectively, the presently sampled value of said signal and the immediately previously sampled value of said signal.

14. Apparatus as specified in claim 13, wherein said sampling means includes generating means for producing a ramp signal the value of which repeatedly sweeps progressively between first and second values, and comparing means connected to receive and to compare said data and ramp signals for producing a first output signal upon the occurrence of a predetermined relationship between the values of said data and ramp signals for each of said sweeps of the latter, and wherein said second means includes circuit means connected to said comparing means and controlled by said output signal to cause the position of one of said points for any given one of said lines to represent the value of said data signal at the time of the production of said output signal of the present one of said sweeps, and to cause the position of the other of said points for that line to represent the value of said data signal at the time of the production of said output signal for the immediately previous one of said sweeps.

15. Apparatus as specified in claim 14, wherein said second means includes display medium marking means and scanning means connected to said generating means for effectively sweeping said marking means across said display medium in synchronism with said sweeping of said ramp signal value, and wherein said circuit means includes activating means for activating said marking means to cause it to mark said medium only for the time period during each of said sweeps in which the value of said ramp signal lies between the values had by said data signal at the times of the production of said output signal for the present and immediately previous ones of said sweeps.

16. Apparatus as specified in claim 15, wherein said marking means includes means for producing a cathode ray tube beam.

17. Apparatus as specified in claim 15, wherein said circuit means includes delay means for producing in each of said sweeps a second output signal at the time at which said ramp signal reaches the value at which said first output signal was produced during the immediately previous one of said sweeps, and control means responsive to said first and second output signals and connected to said activating means to activate said marking means in each sweep upon the production of the one of said first and second output signals which is produced first in that sweep, and to deactivate said marking means in each sweep upon the production of the one of said first and second output signals which is produced last in that sweep.

18. Apparatus as specified in claim 15, wherein said circuit means includes first delay means for producing a second output signal and for changing the latter from a first to a second value for a period equal to the reciprocal of said sweep rate upon being triggered, second delay means for producing a third output signal and for changing the latter from a first to a second value for a period equal to the reciprocal of said sweep rate upon being triggered, switch means connected between said comparing means and said first and second delay means to trigger the latter alternately upon successive productions of said first output signal, and control means responsive to said second and third signals and connected to said activating means to activate said marking means in each sweep upon the occurrence of the first output signal change to occur during that sweep, and to deactivate said marking means in that sweep upon the occurrence of the second output signal change to occur during that sweep 19. Apparatus as specified in claim 15, wherein said circuit means includes memory means for storing in each sweep a memory signal of a value representative of the value of said data signal at the time of the production of said first output signal during that sweep, second comparator means connected to receive and to compare in each sweep said ramp signal and said memory signal as stored during the immediately preceding sweep for producing a second output signal upon the occurrence of a predetermined relationship between said ramp and memory signals, and control means responsive to said first and second output signals and connected to said activating means to activate said marking means in each sweep upon the production of the one of said first and second output signals which is produced first in that sweep, and to deactivate said marking means in each sweep upon the production of the one of said first and second output signals which is produced last in that sweep.

20. Apparatus for producing a graphic display representative of the values of each of a plurality of data signals, comprising generating means for repeatedly producing a comparison signal, comparing means connected to receive said comparison and data signals and to compare said comparison signal to all of said data signals simultaneously during each production of said comparison signal, and means controlled by said comparing means for producing, for each of said data signals during each production of said comparison signal, a substantially continuous line extending between two points on a common display medium, the positions of which points represent, respectively, a function of the value of the corresponding data signal during the present one and the immediately previous one of said productions of said comparison signal.

Disclaimer 3,605,109.—*Tommy N. Tyler*, Englewood, and *Peter R. Lowe*, Denver, Colo. METHOD AND APPARATUS FOR PRODUCING CONTINUOUS GRAPHIC DISPLAYS FROM INTERMITTENTLY SAMPLED DATA. Patent dated Sept. 14, 1971. Disclaimer filed Mar. 6, 1974, by the assignee, *Honeywell Inc.*

Hereby enters this disclaimer to claims 1, 2, 3, 4, 5, 6, 7, 10, 11, 12, 13, 14, 15, 16, 17 and 20 of said patent.

[*Official Gazette May 14, 1974.*]